United States Patent

Torigoe et al.

[11] Patent Number: 5,598,610
[45] Date of Patent: Feb. 4, 1997

[54] INTERENGAGING FASTENER MEMBER, METHOD OF PRODUCING SAME, AND AFFIXATION MEMBER WITH SUCH INTERENGAGING FASTENER MEMBER

[75] Inventors: Shinji Torigoe, Kanagawa; Shinichi Tominaga, Tokyo, both of Japan

[73] Assignee: Minnesota Mining and Manufacturing Company, St. Paul, Minn.

[21] Appl. No.: 406,369

[22] Filed: Mar. 17, 1995

[30] Foreign Application Priority Data

Apr. 1, 1994 [JP] Japan .................................. 6-064830

[51] Int. Cl.$^6$ .................................................. A44B 18/00
[52] U.S. Cl. ........................... 24/444; 24/306; 24/442; 24/447
[58] Field of Search ..................... 24/444, 447, 452, 24/442, 306

[56] References Cited

U.S. PATENT DOCUMENTS

| | | | |
|---|---|---|---|
| 3,031,730 | 5/1962 | Morin | 24/204 |
| 3,851,357 | 12/1974 | Ribich et al. | 24/306 |
| 3,899,803 | 8/1975 | Brumlik | 24/444 |
| 3,981,051 | 9/1976 | Brumlik | 24/447 |
| 4,169,303 | 10/1979 | Lemelson | 24/204 |
| 4,531,733 | 7/1985 | Hall | 273/25 |
| 4,693,921 | 9/1987 | Billarant et al. | 24/444 |
| 4,726,975 | 2/1988 | Hatch | 24/444 |
| 4,784,890 | 11/1988 | Black | 24/306 |
| 4,814,036 | 3/1989 | Hatch | 156/245 |
| 4,931,344 | 6/1990 | Ogawa et al. | 24/444 |
| 4,933,224 | 6/1990 | Hatch | 24/444 |
| 4,984,339 | 1/1991 | Provost et al. | 24/452 |
| 5,058,245 | 10/1991 | Saito | 24/306 |
| 5,110,649 | 5/1992 | Morse et al. | 428/100 |
| 5,179,767 | 1/1993 | Allan | 24/442 |
| 5,379,491 | 1/1995 | Solo | 24/3 R |
| 5,398,387 | 3/1995 | Torigoe et al. | 24/452 |

FOREIGN PATENT DOCUMENTS

| | | |
|---|---|---|
| 2264209 | 3/1974 | France . |
| 1-238805 | 9/1989 | Japan . |
| WO89/08201 | 8/1989 | WIPO . |
| WO92/19119 | 12/1992 | WIPO . |

*Primary Examiner*—Victor N. Sakran
*Attorney, Agent, or Firm*—Gary L. Griswold; Walter N. Kirn; Leland D. Schultz

[57] ABSTRACT

An interengaging fastener member 10 having a base 12 and a plurality of headed elements 14 arranged on the base 12. A plate member 26 is connected to the base 12 as fixing means. The plate member 26 includes a baseplate section 30 embedded in a back surface 28 of the base 12, and a plurality of protruding sections 32 formed on the baseplate section 30 and protruding from the back surface 28 of the base 12. The plate member 26 is disposed as an insert within a mold in an injection molding process of the fastener member 10, and is fixedly connected to the base 12 while the base 12 is integrally molded with the headed elements 14.

8 Claims, 8 Drawing Sheets

INTERENGAGING FASTENER MEMBER, METHOD OF PRODUCING SAME, AND AFFIXATION MEMBER WITH SUCH INTERENGAGING FASTENER MEMBER

FIELD OF THE INVENTION

The present invention relates to an interengaging fastener member. The present invention also relates to a method of producing an interengaging fastener member. Further, the present invention relates to an affixation member having an interengaging fastener member.

BACKGROUND OF THE INVENTION

Interengaging fastener members may be formed by integrally molding a base and a plurality of headed elements from resinous materials. The headed elements may be arranged on a major surface of the base in a predetermined spaced relationship, have been used in various fields as detachable interengaging means which can generally provide a strong engagement-retaining force by using a combination of same fastener members. Such interengaging fastener members may advantageously be used, for example, to attach affixation members for protection or ornamentation onto objects, such as a vehicle body, a boat body, household appliances, or buildings (such as Japanese Patent Application No. 5-194685).

On the other hand, a molded felt material containing discrete fibrous materials and phenol resin materials has been known, as a material used especially for the purpose of sound insulation or cushion for a car, electric appliances, or furnitures (e.g., Japanese Unexamined Patent Publication (Kokai) No. 1-139854). When such a molded felt material should be attached as an affixation member to an object, such as a car body, the above-mentioned interengaging fastener member may be effectively used.

When a structure such as affixation member is attached to the object by the interengaging fastener member, the latter must be firmly fixed onto the surface of a structure to ensure an engagement-retaining force. Conventionally, in order to fix the interengaging fastener member molded from resinous materials onto the surface of a structure, an individual fixing means has been used, such as an adhesive, a pressure sensitive double-coated adhesive tape, or a clip. These fixing means can surely provide a firm fixation, by coating a primer on the surface of the base of the interengaging fastener member and/or the surface of the object for ensuring the adhesion force, or by previously connecting the crip with the base of the interengaging fastener member by an welding process. Such previous works, however, are troublesome and requires a skilled worker, and thus may increase production costs.

The fixing means integrally formed with the base of the interengaging fastener member is intended to act on the surfaces of structure having recesses or projections with which the fixing means can be fitted. Therefore, when the interengaging fastener member having the fixing means should be attached to the structure having no recess or projection, it becomes necessary to form the recess or projection on the surface of the structure. Such a work for forming the recess or projection may cause an increase of the number of processes, operation time, and production costs. Further, when the structure such as affixation member is small in dimensions or thickness, it may be difficult to form the recess or projection in a desired shape.

SUMMARY OF THE INVENTION

The present invention provides an interengaging fastener member comprising a base having a major surface and a back surface opposed to the major surface, a plurality of headed elements arranged on the base in a predetermined spaced relationship; each headed element including a stem projecting from the major surface of the base and a head connected to a distal end of the stem, and fixing means for fixing the base onto a surface of a structure, characterized in that the fixing means comprises a plate member which includes a baseplate section connected to the base and a protruding section formed on the baseplate section and protruding from the back surface of the base.

In this fastener member, the baseplate section of the plate member may be embedded in and secured to the base, whereby at least an end of the protruding section protrudes from the back surface of the base. In this case, it is convenient that the baseplate section of the plate member includes a secondary protrusion protruding oppositely to the protruding section and adapted to be anchored to the base. Also, the base may include a hole extending from the major surface to the back surface, and the baseplate section of the plate member may be arranged in contact with the major surface of the base and the protruding section may extend through the hole of the base so that an end of the protruding section protrudes from the back surface. In this respect, it is advantageous that the baseplate section of the plate member includes an opening to permit at least one headed element to project therethrough. Alternately, the baseplate section of the plate member may be arranged in contact with the back surface of the base, and may be bent near edges of the baseplate section so as to embrace edges of the base, whereby the plate member is connected to the base. It is also convenient that the protruding section of the plate member is formed by stamping the baseplate section. It is preferred that the plate member is made of a metal.

The present invention also provides a method of producing an interengaging fastener member which comprises a base, a plurality of headed elements arranged on the base in a predetermined spaced relationship; each headed element including a stem projecting from the base and a head connected to a distal end of the stem, and fixing means for fixing the base onto a surface of a structure, characterized in that the method comprises the steps of:

a) providing a base mold having a cavity for molding the base, a destructible stem mold having a plurality of cavities for molding the stems of the headed elements, and a head mold having a plurality of cavities for molding the heads of the headed elements;

b) disposing a plate member, which acts as the fixing means, within the cavity for molding the base in the base mold; the plate member having a baseplate section and a protruding section protruding from the baseplate section;

c) securing the destructible stem mold adjacent the base mold with the cavities for molding the stems in fluidic communication with the cavity for molding the base, and securing the head mold adjacent the destructible stem mold with the cavities for molding the heads in fluidic communication with the cavities for molding the stems;

d) flowing a molten material into the cavities of the head mold, the stem mold and the base mold, through an inlet passageway provided to one of the head mold, the stem mold and the base mold, so as to mold the interengaging fastener member having the plate member connected to the base at a predetermined location from the material; and e) separating the base mold and the head mold from the destructible stem mold and the molded interengaging fastener member, and destructively removing the stem mold from the molded interengaging fastener member.

In this case, it is advantageous that the step b) includes a process for covering the protruding section of the plate member with a destructible material, and that the step e) includes a process for destructively removing the material covering the protruding section of the plate member connected to the base, after removing the base mold, the head mold, and the stem mold.

The present invention further provides a method of producing an interengaging fastener member which comprises a base, a plurality of headed elements arranged on the base in a predetermined spaced relationship; each headed element including a stem projecting from the base and a head connected to a distal end of the stem, and fixing means for fixing the base onto a surface of a structure, characterized in that the method comprises the steps of:

a) providing a base mold having a cavity for molding the base, a destructible stem mold having a plurality of cavities for molding the stems of the headed elements, and a head mold having a plurality of cavities for molding the heads of the headed elements;

b) disposing a plate member, which acts as the fixing means, within the cavity for molding the base in the base mold; the plate member having a through slit extending in a curved manner;

c) securing the destructible stem mold adjacent the base mold with the cavities for molding the stems in fluidic communication with the cavity for molding the base, and securing the head mold adjacent the destructible stem mold with the cavities for molding the heads in fluidic communication with the cavities for molding the stems;

d) flowing a molten material into the cavities of the head mold, the stem mold and the base mold, through an inlet passageway provided to one of the head mold, the stem mold and the base mold, so as to mold the interengaging fastener member having the plate member connected to the base at a predetermined location from the material;

e) separating the base mold and the head mold from the destructible stem mold and the molded interengaging fastener member, and destructively removing the stem mold from the molded interengaging fastener member; and f) raising a portion surrounded with the through slit in the plate member connected to the base so as to make the portion protrude from the base.

The present invention further provides an affixation member which comprises a body adapted to be attached to an object, and an interengaging fastener member including a base connected to the body as an insert during a molding process of the base and a plurality of headed elements arranged on the base in a predetermined spaced relationship so as to project from the body; the affixation member being attached to the object by engaging the interengaging fastener member with the object, characterized in that the body includes a molded felt containing discrete fibrous materials and phenol resin materials; the interengaging fastener member includes a plate member which has a baseplate section connected to the base and a protruding section formed on the baseplate section and protruding from a surface of the base opposite to the headed elements; and the protruding section of the plate member is penetrated into and secured to the molded felt, whereby the interengaging fastener member is fixed onto the body.

The plate member is connected to the base of the interengaging fastener member at the baseplate section, while making the protruding section protrude from the back surface of the base. In an injection-molding process of a structure such as an affixation, the interengaging fastener member having such a plate member is disposed as an insert within a mold, and thus the protruding section of the plate member is penetrated into and joined with the structure as the structure being molded. In this manner, the interengaging fastener member can be firmly fixed onto the structure.

BRIEF DESCRIPTION OF THE DRAWING

FIG. 1b is a side view of interengaging fastener member of FIG. 1a;

FIG. 2a is a cross sectional view along Plane 2a—2a of the interengaging fastener member of FIG. 1a;

FIG. 4a is a partial front view of an alternate embodiment of the present invention in which the protruding sections are spatulate shaped with an aperture;

FIG. 5b is a side view of the embodiment of the present invention in FIG. 5a;

Figure 1A:
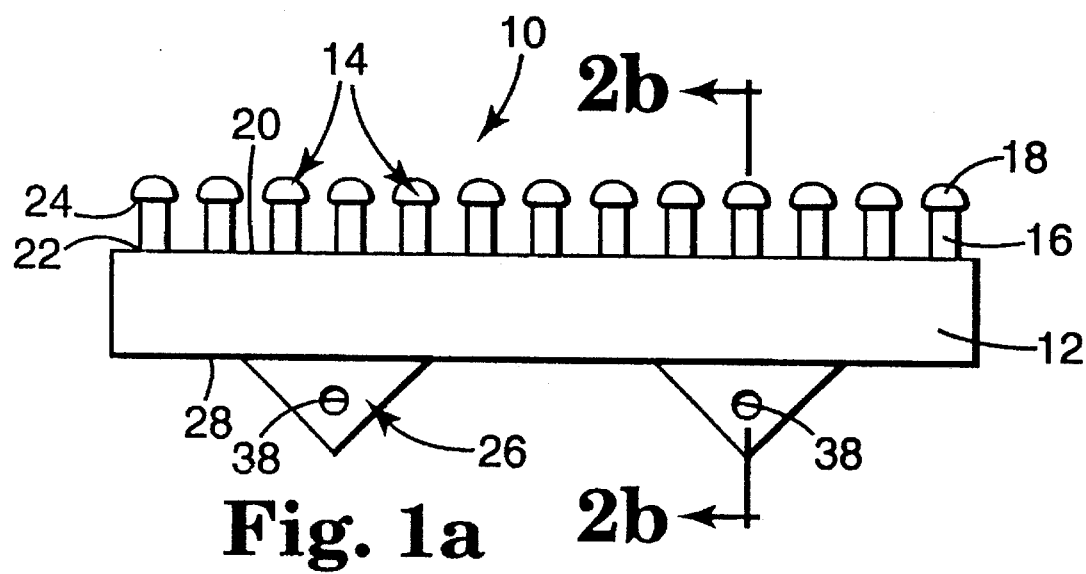
FIG. 1a is a front view of a first embodiment of an interengaging fastener member according to the present invention.

These drawing figures are provided for illustrative purposes only and are not drawn to scale, nor should they be construed to limit the intended scope and purpose of the present invention.

DETAILED DESCRIPTION OF THE INVENTION

The present invention will be described in more detail with reference to the preferred embodiments shown in the attached drawings. Through the drawings, common reference numerals are used for denoting similar or same parts.

Figure 1B:
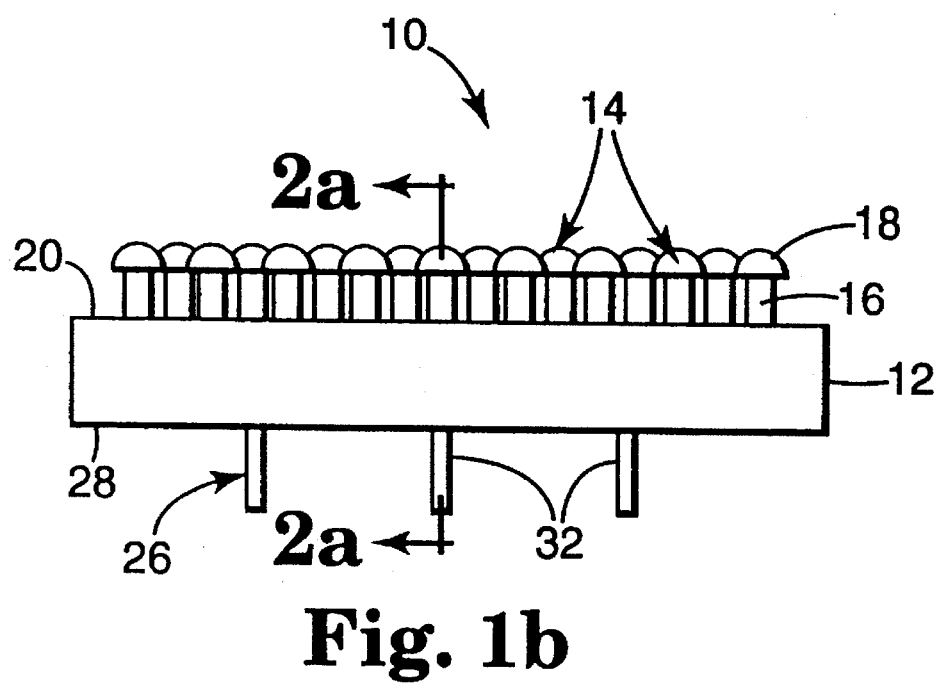

Referring to the drawings, FIGS. 1 (a), (b) show an interengaging fastener member 10 according to a first embodiment of the present invention. The fastener member 10 has a generally flat base 12, and a plurality of headed elements 14 arranged on the base 12 in a predetermined spaced relationship. Each of the headed elements 14 has a stem 16 projecting substantially upright from the base 12, and a hemispherical head 18 formed at a distal end of the stem 16 and having a contour swollen from the periphery of the stem 16. The stem 16 has a proximal end 22 connected to the major surface 20 of the base 12, and a distal end 24 connected to the head 18. Such fastener members are available under the trademark "Dual Lock" from the Minnesota Mining and Manufacturing Company of St. Paul, Minn.

Figure 2A:
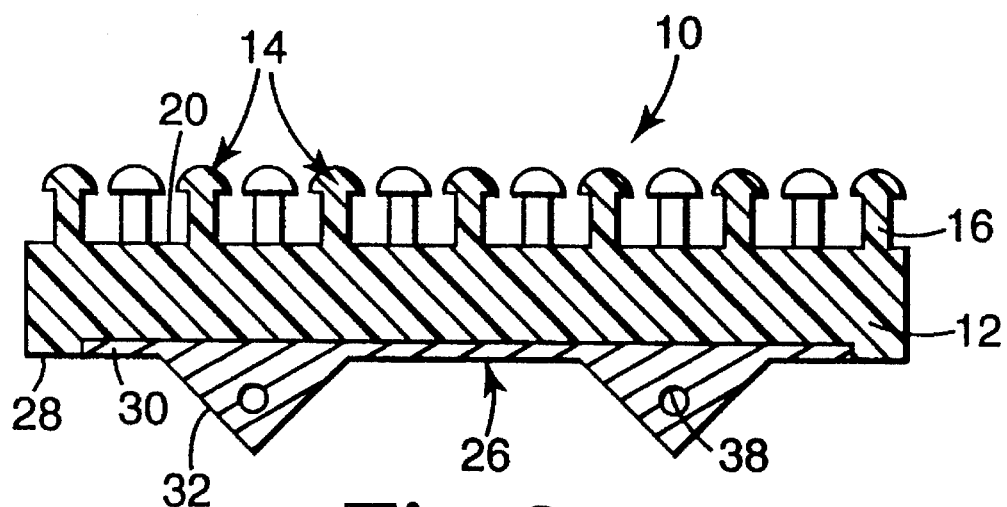
Figure 2B:
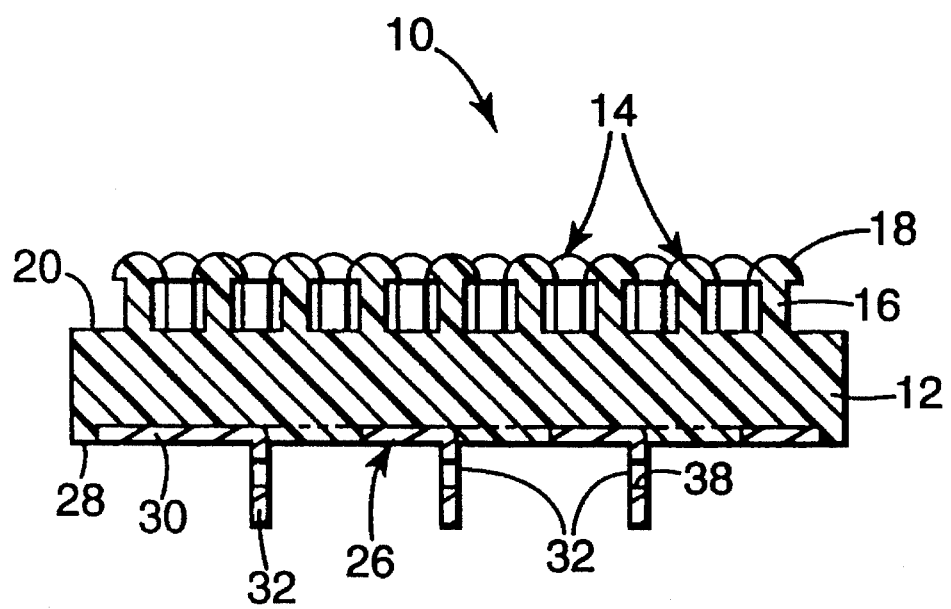
FIG. 2b is a cross sectional view along Plane 2b—2b of the interengaging fastener member of FIG. 1b.

As shown in FIGS. 2 (a), (b), the interengaging fastener member 10 has a plate member 26 connected to the base 12, as means for fixing the base 12 to a surface of a structure. The plate member 26 includes a baseplate section 30 embedded in a back surface 28 of the base 12, and a plurality of protruding sections 32 formed on the baseplate section 30 and protruding from the back surface 28 of the base 12. The plate member 26 is disposed as an insert within a mold in an injection molding process of the fastener member 10, as mentioned below, and is fixedly connected to the base 12 while the base 12 is integrally molded with the headed elements 14.

Figure 3:
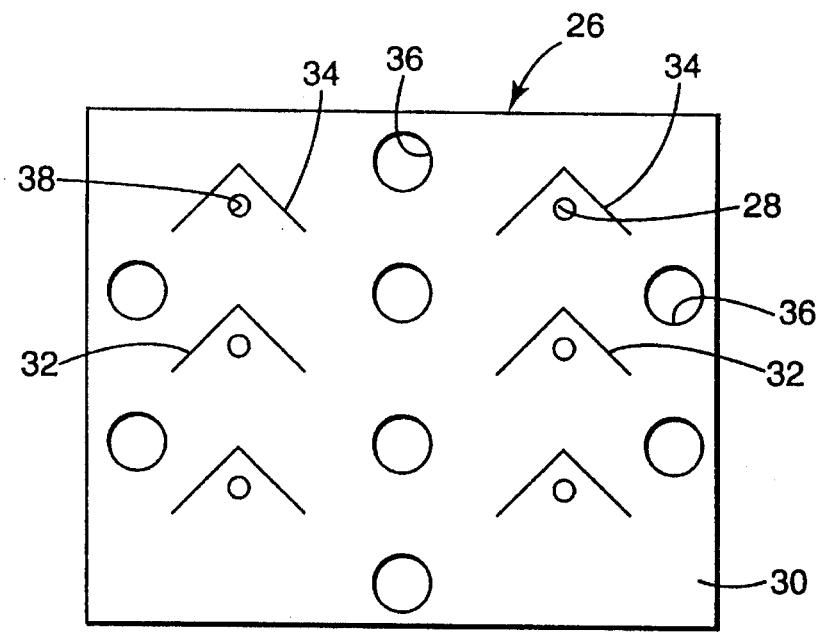
FIG. 3 is a plan view of the interengaging fastener member of FIG. 1a, with the protruding sections remain co-planar with the base plate section.

The plate member 26 is preferably formed from the thin metal plate by a stamping process. In this case, as shown in FIG. 3, a plurality of through slits 34 extending along a bent-line are formed in the plate member 26 by a stamping process, and the portions surrounded with the through slits 34 are raised from the remaining baseplate section 30, whereby the protruding sections 32 are readily formed. In order to facilitate the connection between the base 12 of the fastener member 10 formed by an injection molding and the baseplate section 30 of the plate member 26, it is preferred that a plurality of holes 36 enabling molten materials to enter therein are stamped in the baseplate section 30. Also, in order to enhance the fixation (mentioned below) between the fastener member 10 and the structure such as a molded felt, it is advantageous to provide apertures 38 in the protruding sections 32.

The plate member 26 may have any dimensions and shapes. The shape of the baseplate section 30 may be any suitable shape, such as rectangular, circular, or elliptical, and may be for instance, chosen according to the shape of the base 12 of the interengaging fastener member 10 to which the plate member is applied. The thickness of the plate member 26 may be, for example, in a range of 0.01 mm to 2.0 mm, preferably of 0.05 mm to 1.0 mm, and particularly of 0.1 mm to 0.5 mm. A mechanical strength tends to fail if the thickness is less than the above-mentioned range, while a processibility of, e.g., stamping tends to become difficult if it is greater than the range.

Figure 4A:
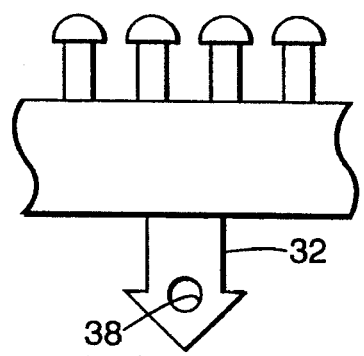
FIG. 4a is a partial front view of an alternate embodiment of the present invention in which the protruding sections are arrowhead shaped.
Figure 4B:
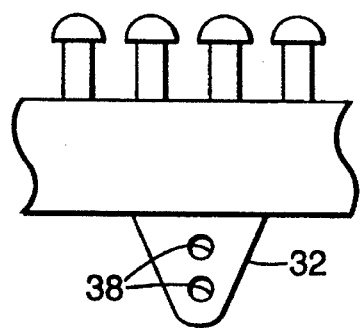
FIG. 4b is a partial front view of an alternate embodiment of the present invention in which the protruding sections are spatulate shaped.
Figure 4C:
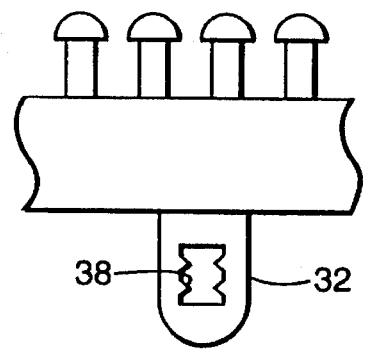
Figure 5A:
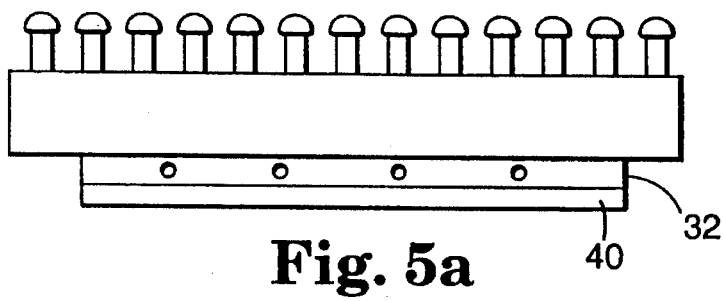
FIG. 5a is a front view of an alternate embodiment of the present invention.
Figure 5B:
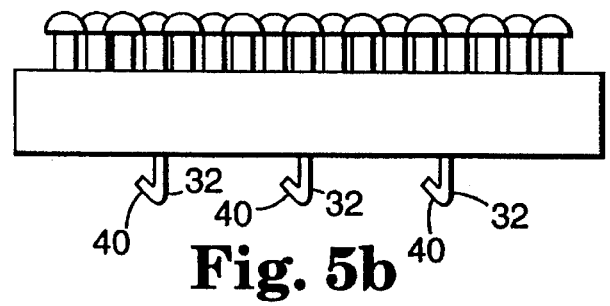

Each protruding section 32, for example, may have an arrowhead or spatulate shape, as shown in FIG. 4 (a) to (c), and the shape and number of the apertures 38 may be suitably chosen. The protruding section 32 may also be provided with a rail shape, as shown in FIG. 5 (a), (b). Further, a hook 40 may be formed at the tip of the protruding section 32. The number of the protruding sections 32 may be optionally set, although is preferably in three (3.0) to ten (10.0) per $cm^2$ in order to ensure the fixation onto a structure such as molded felt and to facilitate a machining process. The length of the protruding section 32 may be, for example, in a range, e.g., of 2 mm to 25 mm, preferably of 3 mm to 20 mm, and particularly of 5 mm to 10 mm. The fixation onto a structure tends to fail if the length is less than the above-mentioned range, while a desired number of the protruding sections tends to be difficult to obtain if it is more than the range.

Figure 6A:
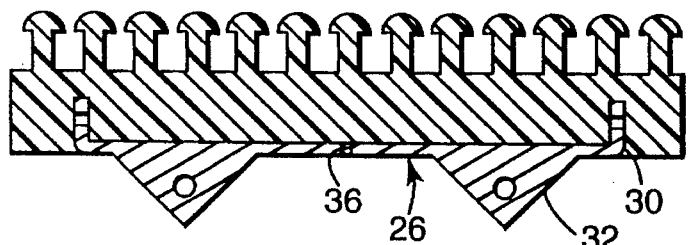
FIG. 6a, 6b and 6c are each cross sectional views along Plant 6'—6' of FIG. 5a of alternate embodiments of the present invention.
Figure 6B:
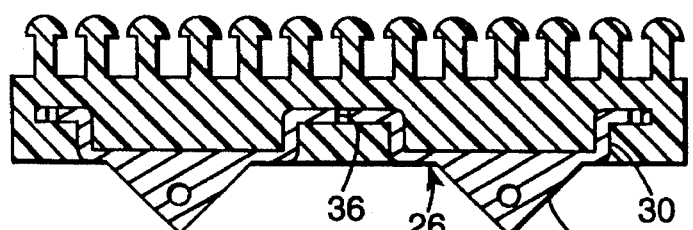
Figure 6C:
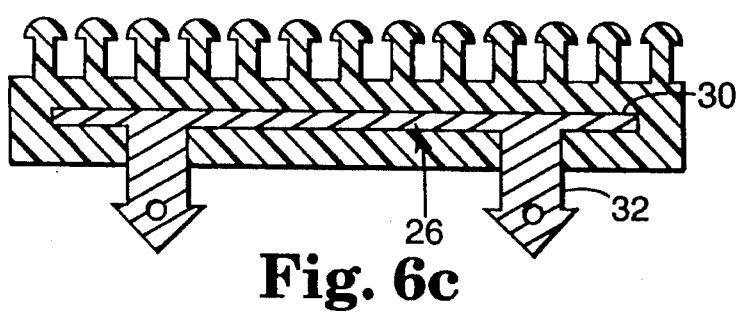
Figure 7A:
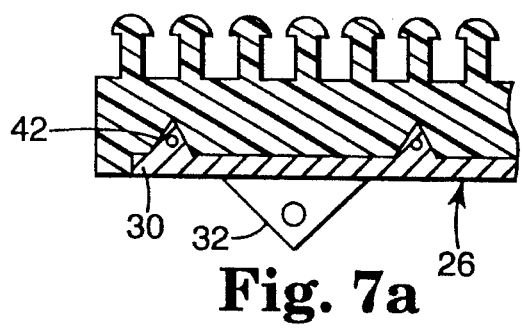
FIG. 7a is a partial cross sectional view along Plane 2a—2a an alternate embodiment of the invention of FIG. 1 with secondary protrusions.
Figure 7B:
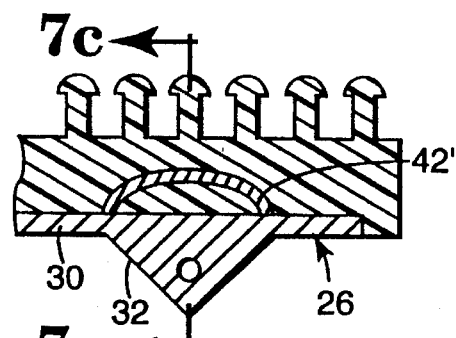
FIG. 7b is a partial cross sectional view along Plane 2a—2a of an alternate embodiment of the present invention.
Figure 7C:
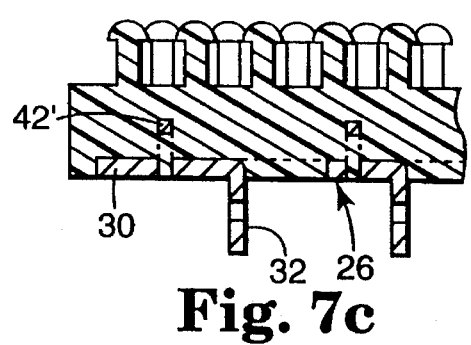
FIG. 7e is a partial cross sectional view along Plane 7c—7c of FIG. 7b of the embodiment of the invention in FIG. 7b.

As shown in FIG. 6 (a), (b), the baseplate section 30 may be bent at the edges or center thereof so as to extend oppositely to the protruding sections 32. Also, as shown in FIG. 6 (c), it is possible to completely embed the entire baseplate section 30 into base 12 so that only the protruding sections 32 are exposed at the back surface 28 of the base 12. The baseplate section 30 bent or completely embedded in this manner is more firmly anchored to the base 12 of the fastener member 10. For the similar end, as shown in FIG. 7 (a) to (c), the baseplate member 30 may be provided with secondary protrusions 42 protruding oppositely to the protruding sections 32. The secondary protrusions 42 may be stamped such as the protruding sections 32, as shown in FIG. 7 (a). Also, the arch-shaped protrusions 42' defined by parallel straight slits may be formed by deformation under pressure. In each case, it is preferred that the secondary protrusions 42 are arranged near the protruding sections 32 in order to ensure a resistance against tensile force which acts on the protruding sections 32. From this viewpoint, the arch-shaped protrusion 42' is advantageously used because the stamped area thereof is small.

The plate member 26 may be made of various materials having excellent mechanical strength. Ceramics or hard resin materials such as phenol or epoxy resin may be used as well as metal. Composite materials such as cermet may also be used. However, it is preferred to use metal from the viewpoint of the strength and processibility, and the preferably used metals are, in particular, a stainless steel such as SUS304, a brass, an iron, or an alloy thereof.

Figure 8A:
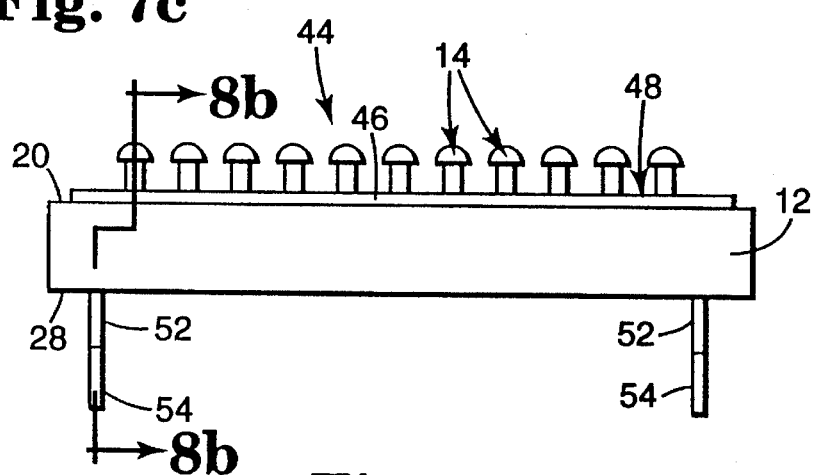
FIG. 8a is a front view of an alternate embodiment of the present invention.
Figure 8B:
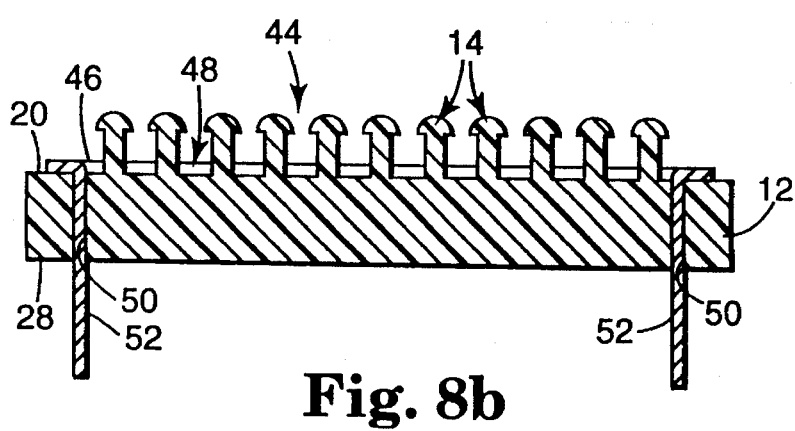
FIG. 8b is a cross sectional view along Plane 8b—8b of FIG. 8a of the embodiment of the present invention.

FIG. 8 (a), (b) shows an interengaging fastener member 44 according to the second embodiment of the present invention. The interengaging fastener member 44 is provided with a base 12 and headed elements 14 similar to those of the fastener member 10 of FIG. 1. The fastener member 44 also has a plate member 48, as fixing means, which includes a baseplate section 46 arranged in contact with the major surface 20 of the base 12. In this embodiment, the base 12 is provided with a plurality of through holes 50 extending from the major surface 20 to the back surface 28. A plurality of protruding sections 52, extending from the baseplate section 46 of the plate member 48, are respectively disposed in the through holes 50, and the ends 54 of the protruding sections 52 protrude from the back surface 28.

Figure 9A:
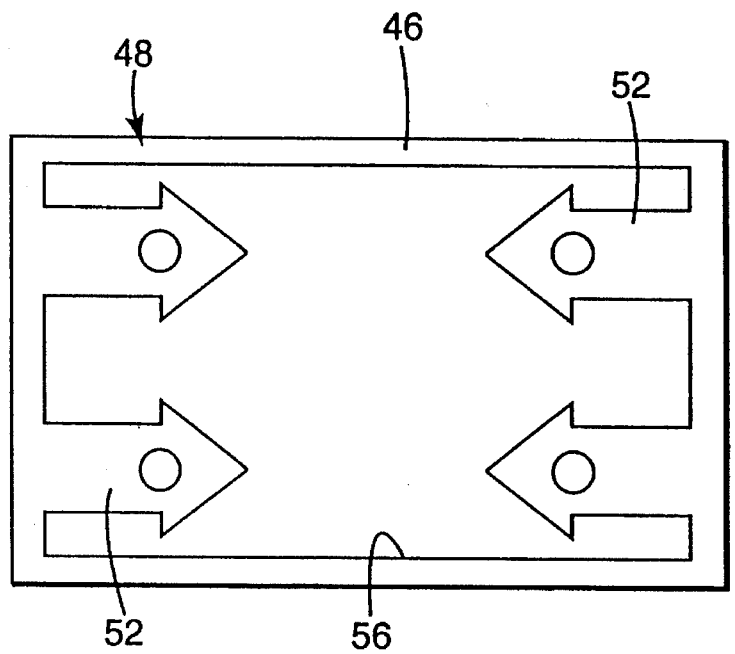
FIG. 9a is a plan view of the embodiment of the present invention of FIG. 8a in which the protrusions remain co-planar with the baseplate section.

In the interengaging fastener member 44, after the base 12 and the headed elements 14 are integrally molded by an injection molding process using a destructible stem mold as mentioned below, the plate member 48 is attached to the base 12. The through holes 50 may also be formed by using a destructible mold, or by a machining process. The plate member 48 may be stamped into, e.g., a shape shown in FIG. 9a, then the protruding sections 52 are bent from the baseplate section 46.

Figure 9B:
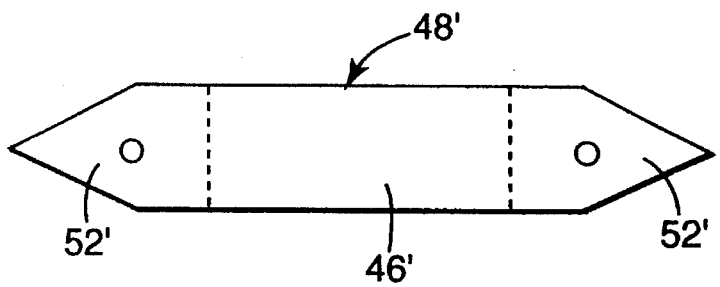
FIG. 9b is a plan view of an alternate embodiment of the baseplate section.

In this manner, an opening 56 is provided in the baseplate section 46, which enables the baseplate section 46 to be arranged in contact with the major surface 20 of the base 12 without interrupting the predetermined arrangement of the headed elements 14. Alternatively, when it is possible to place the baseplate section at the position which does not interfere with the headed elements 14, the plate member 48' shown in FIG. 9 (b) may be used. In this case, the plate member 48' is bent at dashed lines shown in the figure, thereby forming a baseplate section 46' and protruding sections 52'.

When the interengaging fastener member 44 is fixed onto a structure, such as a molded felt, through the protruding sections 52 of the plate member 48, the tensile force acting on the fastener member 44 in the direction of separation from the structure, which in turn is mounted on an object, such as a car body, by the fastener member 44, is securely received by the contact between the baseplate section 46 of the plate member 48 and the base 12 of the fastener member 44, and thus the separation of the fastener member 44 from the structure is prevented. Therefore, it is not necessary to firmly fix the plate member 48 onto the base 12 of the fastener member 44, although adhesives may be used for the fixation.

The resin felt according to this embodiment include the following materials: That is, the resin felt is a material formed by mixing and impregnating phenol resin with uncontinuous fiber such as felt. Resin felts disclosed in Japanese Laid-open Patent Publication No. 1-139854 are applicable to this embodiment, the contents of which are incorporated herein by reference. The uncontinuous fiber means bulky material made of 1–100 mm long fiber consisting of at least one of waste cotton yarn, recovered wool, polyester fiber, acrylic fiber, polyamide fiber, hemp fiber, glass fiber. The thickness of the resin felt is in the range of from 5 to 50 mm. The resin felt is reduced to approximately ½ to ⅓ of the original length after it is heated and hardened. Phenol resin means materials of resol type, novolak type, and denatured type resulting from the condensation of phenol group such as phenol, cresol, xylenol, resorcinol or the like and aldehyde group such as formaldehyde, acetaldehyde, furfural or the like. It is possible to add hexamethylenediamine, acid-base, ammonia or the like to the resin felt as curing agent or curing catalyst. It is preferable to add filler such as silica, alumina, calcium carbonate, stearic acid to the resin felt so as to impart heat-resistant property thereto, improve its strength, and accelerate hardening. As an example of proportion of materials, supposing that the weight percentage of uncontinuous fiber is 100, that of phenol resin of solid resol type is 50, and inorganic powder is 50. As curing conditions, heating temperature is 180° to 240°; pressure is 3 to 30 kg/cm$^2$; and time period is 10 to 180 seconds.

Figure 10:
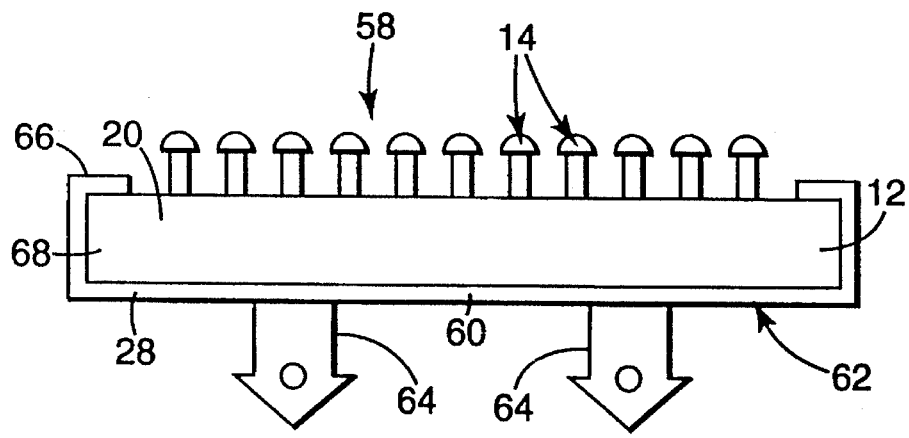
FIG. 10 is a front view of an alternate embodiment of the interengaging fastener member of the present invention.

FIG. 10 shows an interengaging fastener member 58 according to the third embodiment of the present invention. The interengaging fastener member 58 is provided with a base 12 and headed elements 14 similar to those of the fastener member 10 of FIG. 1. The fastener member 58 also has a plate member 62, as fixing means, which includes a baseplate section 60 arranged in contact with the back surface 28 of the base 12. The plate member 62 also includes a plurality of protruding sections 64 formed through, e.g., a stamping and bending process so as to extend from the baseplate section 60. The interface of the baseplate section 60 of the plate member 62 has an area larger than those of the back surface 28 of the base 12, and the edge portions 66 of the baseplate section 60 is bent so as to embrace the edge portions 68 of the base 12. In this manner, the plate member 62 is connected to the base 12 which is integrally formed with the headed elements 14. In the same way as the fastener member 44 of FIG. 8, it is not necessary to firmly fix the plate member 62 onto the base 12 of the fastener member 58, although adhesives may be used for the fixation.

The fastener member according to the present invention may have any dimensions and shapes. For example, in the fastener member 10, the base 12 may be formed in any suitable dimension and shape that can firmly support the headed elements 14, such as a rectangular, circular, or elliptical shape. The thickness of the base 12 is preferably in a range of 0.5 mm through 5.0 mm. The stem 16 of the headed element 14 may have various shapes, such as a cylindrical, prism or frustoconical shape, and more than one stems may be provided for one head 18. Further, a radiused corner having a predetermined radius of curvature may be provided to a junction area between the proximal end 22 of the stem 16 and the major surface 20 of the base 12, for attenuating a stress concentration caused by the deflection of the headed element 14.

The head 18 may have various shapes beside of the illustrated hemispherical shape, such as a spherical, pyramidal, or umbrella shape. For example, in the headed element 14 having a cylindrical stem 16 and a hemispherical head 18, the diameter of the stem 16 is preferably in a range of 20% through 70% of the diameter of the head 18, in order to obtain sufficient engagement-retaining force. Also, the peripheral edge of the head 18 is preferably formed with no sharp-edged portion, for reducing scratch noises generated when the head is engaged with the head of the opposed headed element. Further, the head 18 may have recesses or grooves for reducing an engagement force required for interengagement.

The fastener member according to the present invention may be made of various materials. For example, in the fastener member 10, the base 12 may be formed of a polymeric material, such as polyamide resin, polyester resin, polypropylene resin, polyethylene resin, or polyacetal resin, or a metallic material, such as aluminum. Especially, the polyamide resin is one of the most suitable materials because of the excellent thermal durability, mechanical strength and injection-molding aptitude. The headed element 14 may be made of the same material as that of the base 12. Alternatively, the stem 16 of the headed element 14 may be made of a high-strength material different from the material of the base 12 and the head 18, for improving a durability. The base 12 and the headed elements 14 are preferably made of a material having a bending modulus of elasticity in a range of 1,000 kgf/cm$^2$ through 100,000 kgf/cm$^2$ according to a measurement based on ASTM testing method D790. Also, it is possible to add a plasticizer or rubber, or to add a reinforcing member, such as carbon fibers or glass fibers, to the polymeric material, so as to suitably modify or change the elastic modulus of the base 12 and the headed elements 14.

The interengaging fastener member according to the present invention may be formed by various methods. To easily form the headed elements having unique shapes, it is advantageous to integrally mold the base and the headed elements by an injection molding process using a destructible stem mold, as is disclosed in U.S. Pat. No. 5,242,646, the contents of which is incorporated herein by reference. This method will be described below with reference to FIGS. 11a and 11b.

Figure 11A:
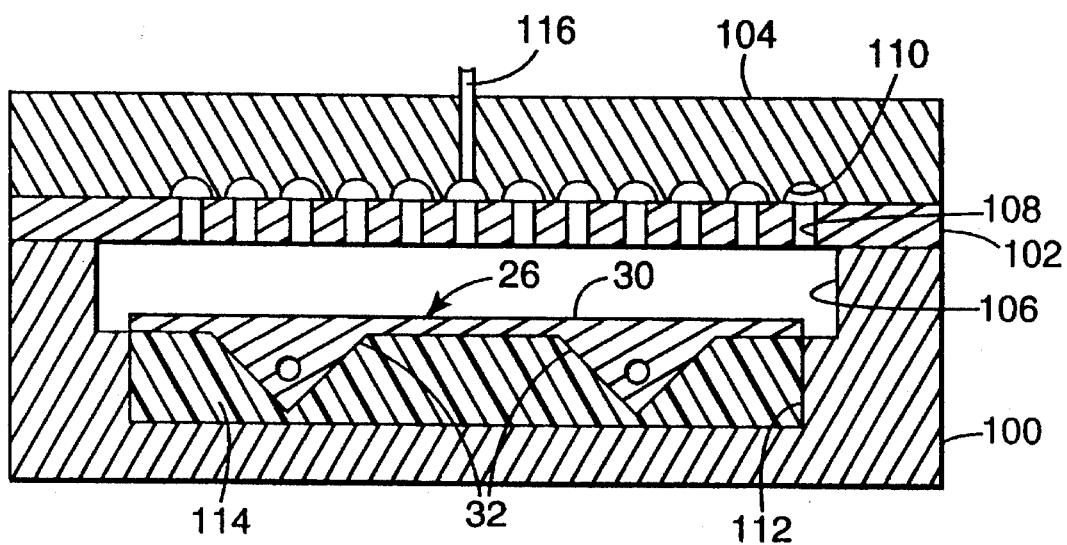
FIG. 11a is a front cross sectional view of the embodiment of the present invention shown in FIG. 1a formed within a mold.
Figure 11B:
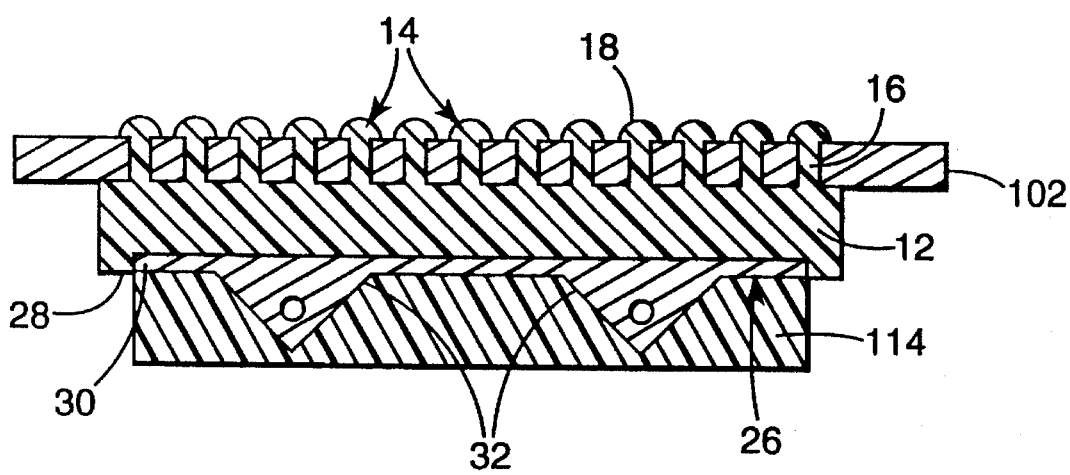
FIG. 11b is a front cross sectional view of the embodiment of the present invention with a stem mold.

FIGS. 11a and 11b diagrammatically illustrate a manufacturing process of the fastener member 10 by way of example. As shown in FIG. 11a, a base mold 100 for molding the base 12 of the interengaging fastener member 10, a stem mold 102 for molding the stems 16 of the headed elements 14, and a head mold 104 for molding the heads 18 of headed elements 14 are prepared. The base mold 100 is, e.g., a permanent mold which can be released from the molded fastener member 10 without destruction thereof, and has a cavity 106 corresponding to the base 12. The stem mold 102 is a destructible mold which can be destructively removed from the molded fastener member 10 in a manner as described below, and has a plurality of cavities 108 corresponding to the stems 16. The head mold 104 is, e.g., a permanent mold which can be released from the molded fastener member 10 without destruction thereof, and has a plurality of cavities 110 corresponding to the heads 18. The cavities 106, 108 and 110 may have various contours corresponding to the desired shapes of the base 12, stems 16 and heads 18, as described above. The base mold 100 also has a space 112 connected to the bottom of the cavity 106 for disposing the plate member 26.

The stem mold 102 is durable as a core used in the injection molding process for forming the fastener member 10, and can be destructibly removed from the molded fastener member 10 by various means, after the fastener member 10 has been molded. For example, the stem mold 102 may be removed from the periphery of the stems 16 by various mechanical and chemical methods, such as dissolving with a solvent (e.g., water or alcohol), melting, disintegrating, shattering (e.g., by ultrasonic wave), or cutting, without damaging the fastener member 10. In a preferred embodiment, the stem mold 102 is made of a water-soluble material, such as a polyvinyl alcohol. In this case, the stem mold 102 can be removed from the fastener member 10 by immersing the mold in cold or hot water and vibrating the mold. The water-soluble materials suitably used for the present invention are disclosed, for example, in European Patent Application No. 314,156, and U.S. Pat. Nos. 4,990,146 and 4,870,148, the contents of which are incorporated herein by reference. In this connection, the stem mold 102 may be formed in a desired shape by a well-known injection molding process.

Firstly, the plate member 26, of which the protruding sections 32 are covered by a destructible material 114, is disposed within the cavity 106 of the base mold 100 in such a manner that the material 114 is inserted into the space 112 and the baseplate section 30 is exposed in the cavity 106, as illustrated. In this respect, the destructible material 114 may be made of the same material of the stem mold 102. Then, the stem mold 102 is fixedly arranged between the base mold 100 and the head mold 104. The cavity 106 of the base mold 100, the cavities 108 of the stem mold 102, and the cavities 110 of the head mold 104 are connected with each other so that a fluid can flow therethrough. In this state, a molten polymeric material is flowed into the cavity 110 through an inlet passageway 116 provided in, e.g., the head mold 104.

Thereafter, as the molten polymeric material is solidified, the interengaging fastener member 10, in which the baseplate section 30 of the plate member 26 is connected to the predetermined position of the back surface 28 of the base 12, is integrally molded in the base mold 100, the stem mold 102, and the head mold 104. Once the fastener member 10 has been molded, the base and head molds 100, 104 are removed from the molded fastener member 10, while remaining the stem mold 102 (see FIG. 11b). Then, the stem mold 102 and the material 114 are destructively removed from the periphery of the stems 16 of headed elements 14 and the protruding sections 32 of the plate member 26 by various means described above. Thus, the interengaging fastener member 10 shown in FIG. 1 is completed.

In the above-mentioned process, a plurality of spaces adapted to closely accommodate the protruding sections 32 of the plate member 26 may be formed at the bottom of the cavity 106 of the base mold 100. In this case, the space 112 and the material 114 may be eliminated.

Further, in the above-mentioned process, the plate member 26 may be disposed within the cavity 106 of the base mold 100 in the state as shown in FIG. 3, i.e., in the state where the protruding sections 32 have not yet been raised from the baseplate section 30 alter stamping process. In this case, the space 112 and the material 114 can be omitted. When the base 12 and the headed elements 14 are integrally molded in this arrangement in the same manner as described above, the interengaging fastener member 10, of which the plate member 26 having the protruding sections 32 left in coplanar with the baseplate section 30 is connected to the back surface 28 of the base 12, is formed. Thereafter, the portions surrounded with the through slits 34, i.e., the protruding sections 32 are raised, so that the interengaging fastener member 10 shown in FIG. 1 is completed.

Figure 12:
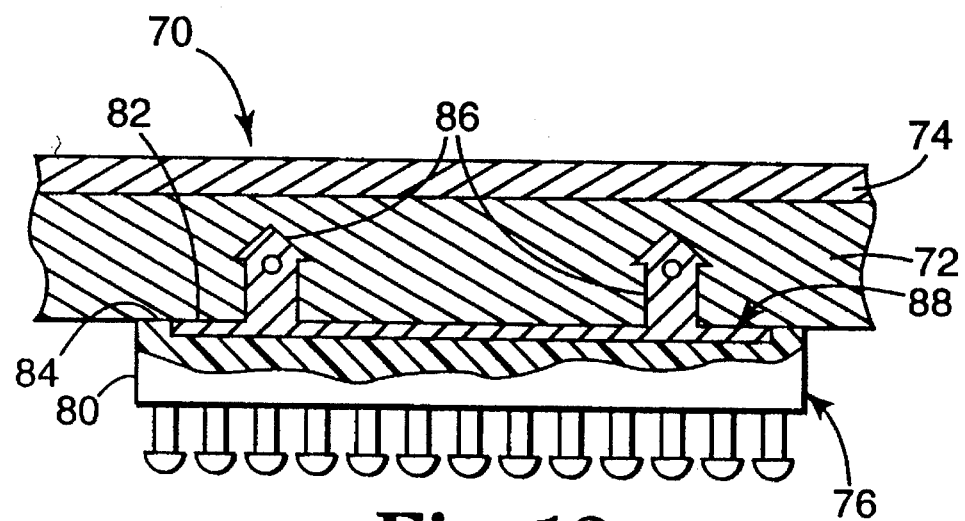
FIG. 12 is a front, partial cross sectional view of the embodiment of the present invention shown in FIG. 1 mounted on an object.
Figure 13:
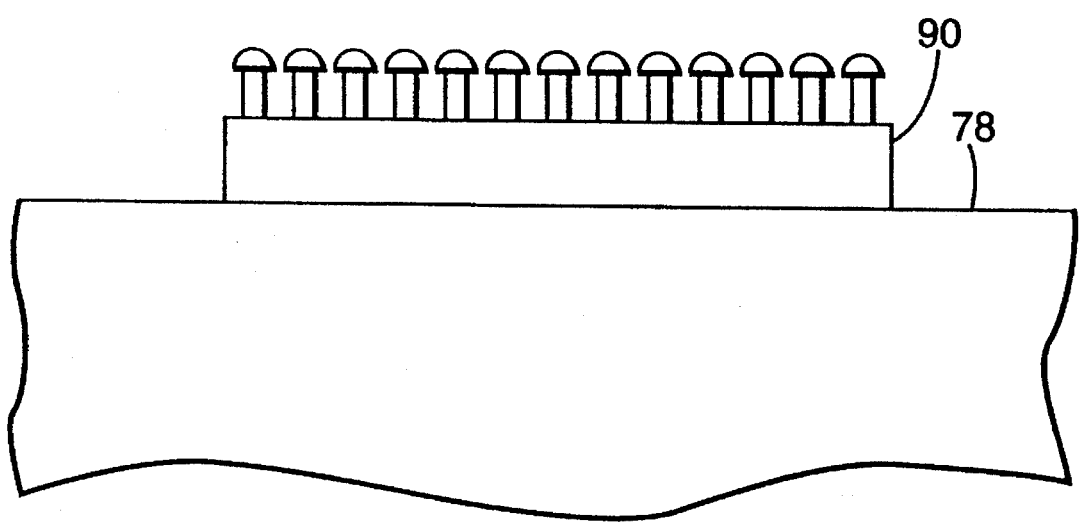
FIG. 13 is a front view of the embodiment of the present invention shown in FIG. 2 mounted on an object.

FIG. 12 shows an affixation member 70 having an interengaging fastener member, according to the embodiment of the present invention. The affixation member 70 includes a body formed by stacking a cushion layer 72 and a cover layer 74 applied onto the cushion layer 72 for ornamentation, and an interengaging fastener member 76 fixed to the cushion layer 72 at the side opposite to the cover layer 74. The affixation member 70 may be used, e.g., as an interior trim material of a car, and attached to an object 78 such as a body panel through the fastener member 76. The cushion layer 72 may be formed from, e.g., a molded felt containing discrete fibrous materials and phenol resin materials (e.g., Japanese Unexamined Patent Publication (Kokai) No. 1-139854). The interengaging fastener member 76 has a construction similar to the interengaging fastener member 10 of FIG. 1, and includes a plate member 88, as fixing means to the cushion layer 72, which has a baseplate section 82 connected to the base 80 and a protruding section 86 formed on the baseplate section 82 and protruding from a back surface 84 of the base 80. The protruding section 86 of the plate member 88 is penetrated into and secured to the cushion layer 72 by the manufacturing process mentioned below. The other fastener member 90 which can be engaged with the fastener member 76 is secured on the surface of the object 78.

The affixation member 70 may be formed by arranging the fastener member 76 as an insert within a mold of the cushion layer 72 in a molding process of the cushion layer 72. Thus, the fastener member 76, of which the protruding section 86 of the plate member 88 is inserted into the cushion layer 72 which has not yet been molded, is fixed on to the cushion layer 72 as the latter being molded. Thereafter, the cover layer 74 is applied onto the cushion layer 72. When the cushion layer 72 is made of the molded felt mentioned above, the cushion layer 72 can be molded through a heat and press process as well known in the art.

As apparent from the above description, in the present invention, means for fixing an interengaging fastener member onto a structure is formed from a plate member which includes a baseplate section connected to the base of the fastener member and a protruding section protruding from the back surface of the base. As a result, by arranging the fastener member having such a plate member as an insert within a mold in a molding process of the structure, the protruding section is penetrated into and connected to the structure as the latter being molded, so that the fastener member can be fixed onto the structure. Therefore, according to the present invention, it is possible to easily and firmly fix the interengaging fastener member onto the structure without doing any mechanical processes on the structure, which prevents the number of processes and the operation time from being increased and thus reduces the production costs. The structure onto which the interengaging fastener member is fixed can be attached to an object under a strong engagement-retaining force.

Although the present invention has been described with reference to preferred embodiments, workers skilled in the art will recognize that changes may be made in form and detail without departing from the spirit and scope of the invention.

What is claimed is:

1. An interengaging fastener member comprising:
   (a) a base having a major surface and a back surface opposed to the major surface, including a plurality of headed elements arranged on the base in a predetermined spaced relationship, each headed element including a stem projecting from the major surface of the base and a head connected to a distal end of the stem: and
   (b) fixing means for fixing the base onto a surface of a structure such that the fixing means comprises a plate member which includes a baseplate section connected to either the major surface or the back surface of the base and a rigid protruding section formed on the baseplate section and protruding from the back surface of the base, the rigid protruding section including at least one aperture to enhance fixation with the surface of the structure.

2. An interengaging fastener member as set forth in claim 1, wherein the baseplate section of the plate member is embedded in and secured to the base, whereby at least an end of the protruding section protrudes from the back surface of the base.

3. An interengaging fastener member as set forth in claim 2, wherein the baseplate section of the plate member includes a secondary protrusion protruding oppositely to the protruding section and adapted to be anchored to the base.

4. An interengaging fastener member as set forth in claim 1, wherein the base includes a hole extending from the major surface to the back surface, and wherein the baseplate section of the plate member is arranged in contact with the major surface of the base and the protruding section extends through the hole of the base so that an end of the protruding section protrudes from the back surface.

5. An interengaging fastener member as set forth in claim 4, wherein the baseplate section of the plate member includes an opening to permit at least one headed element to project therethrough.

6. An interengaging fastener member as set forth in claim 1, wherein the baseplate section of the plate member is arranged in contact with the back surface of the base, and is bent near edges of the baseplate section so as to embrace edges of the base, whereby the plate member is connected to the base.

7. An interengaging fastener member as set forth in any one of claims 1 to 6, wherein the protruding section of the plate member is formed by stamping the baseplate section.

8. An interengaging fastener member as in any one of claims 1 to 6, wherein the plate member is made of a metal.

* * * * *